US008639822B2

(12) United States Patent
Ramaiah et al.

(10) Patent No.: US 8,639,822 B2
(45) Date of Patent: Jan. 28, 2014

(54) EXTENDING APPLICATION-LAYER SESSIONS BASED ON OUT-OF-ORDER MESSAGES

(75) Inventors: Anantha Ramaiah, San Jose, CA (US); Keyur Patel, San Jose, CA (US); Shrirang Bage, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 12/986,929

(22) Filed: Jan. 7, 2011

(65) Prior Publication Data

US 2012/0179934 A1    Jul. 12, 2012

(51) Int. Cl.
*H04L 29/06* (2006.01)
(52) U.S. Cl.
USPC ............................................. 709/227; 714/18
(58) Field of Classification Search
None
See application file for complete search history.

(56) References Cited

U.S. PATENT DOCUMENTS

| | | | | |
|---|---|---|---|---|
| 7,406,087 | B1* | 7/2008 | Quach et al. | 370/401 |
| 7,773,611 | B2* | 8/2010 | Booth et al. | 370/401 |
| 8,051,433 | B1* | 11/2011 | Alcock et al. | 719/320 |
| 8,060,645 | B1* | 11/2011 | Catania | 709/234 |
| 8,184,540 | B1* | 5/2012 | Perla et al. | 370/235 |
| 2002/0075857 | A1* | 6/2002 | LeBlanc | 370/352 |
| 2003/0112802 | A1* | 6/2003 | Ono et al. | 370/389 |
| 2007/0005973 | A1* | 1/2007 | Mynam et al. | 713/171 |
| 2008/0043750 | A1* | 2/2008 | Keels et al. | 370/395.52 |

OTHER PUBLICATIONS

Watari, M.; Hei, Y.; Ano, S.; Yamazaki, K., Networking, 2008. ICN 2008. Seventh International Conference on Digital Object Identifier: 10.1109/ICN.2008.24 , Publication Year: 2008 , pp. 663-668.*
Linthicum, David, S., Enterprise Application Integration, Dec. 2003, Addison-Wesley information technology series, ISBN 0201615835.*
Kiely, D., "Interacting with Message Queues" dated Jan. 2002 downloaded from the Internet on Apr. 15, 2011 < http://msdn.microsoft.com/en-us/library/ms973860.aspx > (15 pages).

* cited by examiner

*Primary Examiner* — Oscar Louie
*Assistant Examiner* — Olanrewaju Bucknor
(74) *Attorney, Agent, or Firm* — Hickman Palermo Truong Becker Bingham Wong LLP

(57) ABSTRACT

A method and non-transitory computer-readable medium are disclosed for extending a hold timer that binds an application-layer session when a transport-layer out-of-order message queue includes an out-of-order message for the application-layer session. An application receives an application-layer message from transport protocol logic that is configured to deliver in-order application-layer messages to the application. The received application-layer message is a next in-order application-layer message for an application-layer session that is bound by a hold timer. After an amount time has passed, the application detects an expiration of the hold timer. In response, rather than immediately tearing down the application-layer session, the application inspects an out-of-order queue of the transport protocol logic. The hold timer is extended when the out-of-order queue includes an out-of-order application-layer message for the application-layer session. In one aspect, the transport protocol logic includes an application programming interface that provides the application with access to the out-of-order queue.

18 Claims, 6 Drawing Sheets

FIG. 5

```
LISTEN FOR COMMANDS ON AN APPLICATION PROGRAMMING
INTERFACE TO AN OUT-OF-ORDER QUEUE
502
```

```
RECEIVE A COMMAND FROM AN APPLICATION INSTANCE ON THE
APPLICATION PROGRAMMING INTERFACE TO THE
OUT-OF-ORDER QUEUE
504
```

```
EXECUTE THE COMMAND BY ACCESSING OUT-OF-ORDER QUEUE
AND RETURNING REQUESTED INFORMATION FROM
OUT-OF-ORDER QUEUE TO THE APPLICATION INSTANCE
506
```

EXTENDING APPLICATION-LAYER SESSIONS BASED ON OUT-OF-ORDER MESSAGES

TECHNICAL FIELD

The present disclosure generally relates to extending application-layer network data communication sessions for computer program applications that use a reliable transport protocol.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An application instance communicates with other application instances over a network using application-layer messages. To promote ordered and reliable delivery of application-layer messages, application-layer messages may be embedded in transport-layer messages that are communicated between transport-layer endpoints. The transport-layer endpoints gather the received transport-layer messages and deliver the embedded application-layer messages to the application instances according to the order in which the messages were sent.

Due to packet loss, latency, or for some other reason, segments may be received out-of-order by a transport-layer endpoint. In one example, a transport-layer endpoint sends three segments in order, and the receiving transport-layer endpoint receives the first segment and the third segment, but not the second segment. The second segment may be lost or delayed before reaching the receiving transport-layer endpoint. The third segment in the example is an out-of-order segment because the third segment was third segment was sent after the second segment even though the third segment was received before the second segment. The receiving transport-layer endpoint stores received out-of-order segments in an out-of-order queue.

To ensure ordered and reliable delivery of application-layer messages, application-layer messages from the out-of-order queue are not forwarded to the application instance until the missing segment(s) are received. In the example, once the second segment is received, the application-layer messages in the second and third segments are forwarded to the application. Because the application relies on ordered and reliable delivery of application-layer messages, the application may fail or otherwise react unexpectedly if order is not strictly enforced by the transport-layer endpoint.

BRIEF DESCRIPTION OF THE DRAWINGS

In the drawings:

FIG. 5 illustrates an example technique for providing an application programming interface that gives an application instance access to the out-of-order queue.

DETAILED DESCRIPTION

Figure 1:
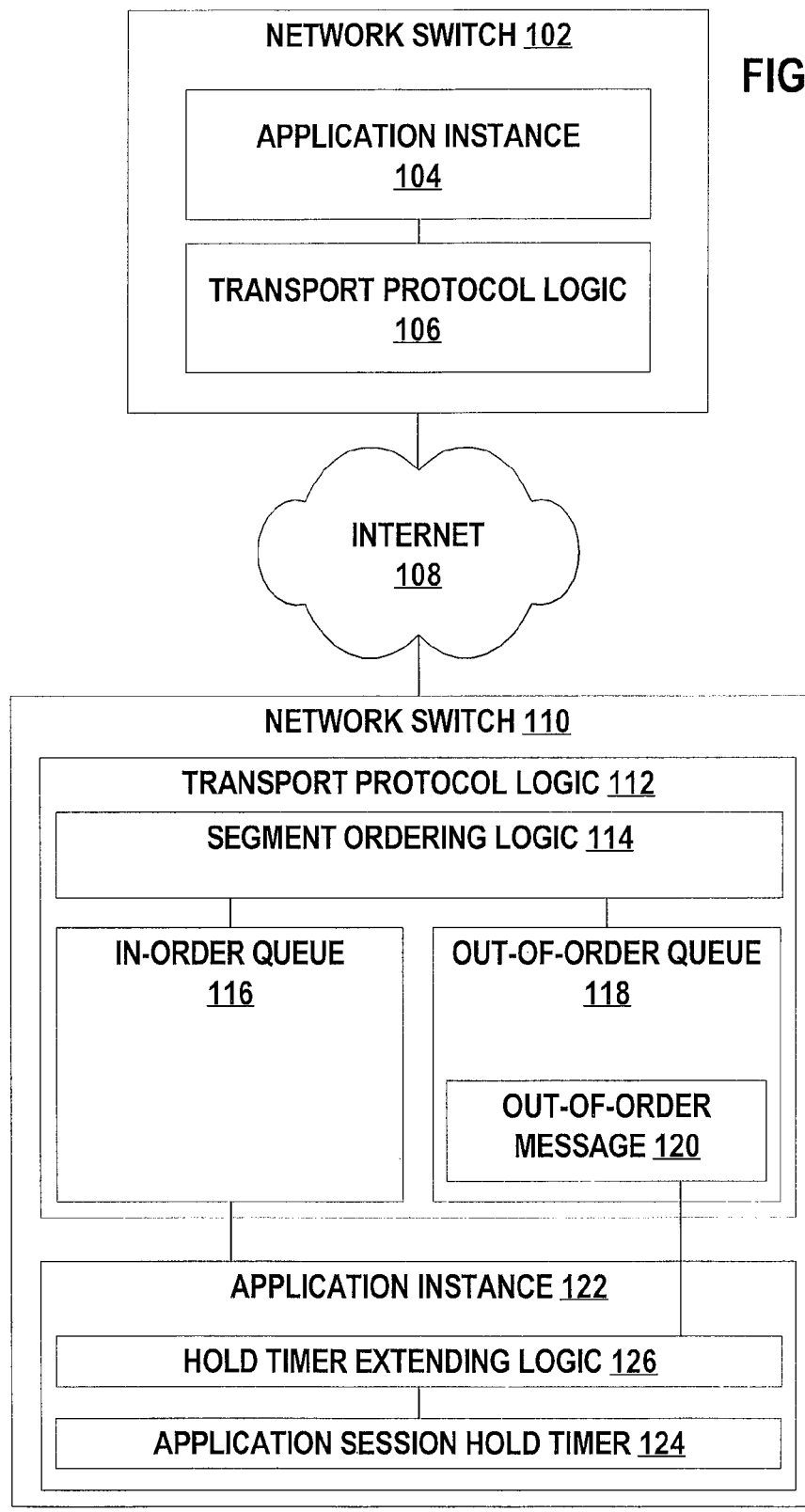
FIG. 1 illustrates an example system having an application instance configured to extend the hold timer for an application-layer session when an out-of-order queue includes an application-layer message that belongs to the application-layer session.

Extending an application-layer session based on out-of-order messages is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
        2.1 Ordering And Forwarding Messages From the Transport Layer To The Application Layer
        2.2 Maintaining The Application Hold Timer
        2.3 Peeking The Transport-Layer Out-Of-Order Queue
        2.4 Extending The Application Layer Session
        2.5 Inducing A Fast Retransmission Of A Missing Packet
    3.0 Implementation Example—Extending A BGP Hold Timer
    4.0 Implementation Mechanisms—Hardware Overview
    5.0 Extensions and Alternatives
    1.0 General Overview A method and non-transitory computer-readable medium are disclosed for extending a hold timer that binds an application-layer session when a transport-layer out-of-order message queue includes an out-of-order message for the application-layer session. In an embodiment, an application receives an application-layer message from transport protocol logic that is configured to deliver in-order application-layer messages to the application. The received application-layer message is a next in-order application-layer message for an application-layer session that is bound by a hold timer. After an amount time has passed, the application detects an expiration of the hold timer. In response, rather than immediately tearing down the application-layer session, the application inspects an out-of-order queue of the transport protocol logic. The hold timer is extended in duration when the out-of-order queue includes an out-of-order application-layer message for the application-layer session. In one aspect, the transport protocol logic includes an application programming interface that provides the application with access to the out-of-order queue.

In an embodiment, an application receives in-order application-layer messages from transport protocol logic. The application-layer messages are associated with an application-layer session that is bound by a hold timer. The hold timer, which is managed by the application, specifies how long the application-layer session is to remain open in the absence of received application-layer messages for the application-layer session. In one embodiment, in response to detecting an expiration of the hold timer for the application-layer session, the application is configured to read a set of out-of-order messages from the transport protocol logic. By inspecting or peeking into a set of out-of-order messages at the transport layer, the application discovers that an out-of-order application-layer message belonging to an expiring application-layer session is in the set. In response to discovering that the out-of-order application-layer message belonging to the expiring application-layer session is in the set, the application may extend the application-layer session in duration by extending the hold timer in duration for the application-layer session. Extending the hold timer prevents the application-layer session from being torn down.

In one embodiment, the application utilizes an application programming interface to request information from the transport-layer out-of-order queue. In various examples, in a request for information from the transport-layer out-of-order queue, the application uses the application programming interface to specify one or more of: a maximum size of each out-of-order message to read, a maximum number of out-of-order messages to read, a maximum total size of information to read, or a connection identifier associated with an expiring application-layer session. In a specific example, the application specifies a size of an application-layer keepalive message as the maximum size of each out-of-order message. In this manner, the application reads only the portion of each message that is necessary to determine whether the message is a keepalive message for the application-layer session. In a specific embodiment, the read portion of each application-layer message is the application-layer header. In various other embodiments, the read portion may include at least part of the application-layer header and/or at least part of the application-layer payload. Although the application reads information from out-of-order messages in the transport-layer out-of-order queue, these out-of-order messages may remain in the transport-layer out-of-order queue until missing in-order messages are received at the transport-layer. Upon receipt of missing in-order messages, out-of-order messages become in-order messages and are migrated to the in-order queue and sent to the application for processing.

Once the application discovers that the transport protocol logic has received an out-of-order segment that includes an application-layer message for the application-layer session, the application may expedite retrieval of a missing packet by triggering a fast retransmission of the missing segment. In one embodiment, the application instructs the transport protocol logic to send two duplicate acknowledgements for a received segment that precedes the missing in-order segment. If a remote peer receives the duplicate acknowledgements, the remote peer retransmits the missing segment, which has yet to be acknowledged.

The techniques described herein may be used in conjunction with any transport-layer protocol that orders packets for an application-layer protocol. In one embodiment, a Border Gateway Protocol ("BGP") application peeks into an out-of-order queue managed by Transmission Control Protocol ("TCP") logic. The BGP application may look at TCP's out-of-order queue for BGP messages that belong to an expiring BGP session. In one embodiment, because BGP keepalive messages are 19 bytes long, the BGP application may request the first 19 bytes of each segment stored in the out-of-order queue. If the out-of-order queue includes a keepalive message for the BGP session, then the BGP application may prevent the BGP session from being torn down by extending a BGP hold timer for the BGP session. Additionally, the BGP application may trigger a fast retransmission of a missing segment for the BGP session.

In one embodiment, the subject matter described herein encompasses one or more special purpose computing devices that are configured to carry out the foregoing steps. In another embodiment, the subject matter described herein encompasses a process that is performed by the one or more special purpose computing devices. In still another embodiment, the subject matter described herein encompasses a non-transitory computer-readable medium storing sequences of instructions which, when executed by one or more processors, cause the one or more processors to perform the foregoing steps.

2.0 Structural and Functional Overview

FIG. 1 illustrates an example system of networked computers having an application instance that is configured to extend a hold timer for an application-layer session when an out-of-order queue includes an application-layer message that belongs to the application-layer session.

In an embodiment, a network switch 102 includes an application instance 104 for generating application-layer messages that are sent to other application instances and reading application-layer messages from other application instances. Network switch 102 also includes transport protocol logic 106 for placing the application-layer messages in transport-layer messages and sending and receiving the transport-layer messages according to a reliable transport protocol. Network switch 102 communicates with other network switches through a network such as Internet 108. Network switch 102 may comprise a computer configured as a packet data switch, such as one of the Cisco Catalyst Series of switches from Cisco Systems, Inc., San Jose, Calif.

In one example, application instance 104 generates application-layer messages, which are embedded in transport-layer messages by transport protocol logic 106. The transport-layer messages are sent in packets from network switch 102, through one or more other network devices on Internet 108, to network switch 110. At network switch 110, transport protocol logic 112 receives the transport-layer messages sent by transport protocol logic 106. Due to a failure or delay of one or more intermediate network devices between network switch 102 and network switch 110, or for some other reason, packets may be lost or delayed during transmission to network switch 110. As a consequence, transport protocol logic 112 may receive the segments in a different order than the order in which they were sent.

Regardless of the order in which the segments were received by transport logic 112, packet ordering logic 114 orders the segments such that the embedded application-layer messages are forwarded to application instance 122 in the order in which they were sent by a remote peer. For example, packet ordering logic 114 may order the packets based on a sequence number that increases as packets are sent between network switch 102 and network switch 110. In various embodiments, transport logic 112 may order and forward messages for a plurality of applications that are running on or coupled to network switch 110.

Upon receipt of a segment, segment ordering logic 114 places the segment into an in-order queue 116 or an out-of-order queue 118. In-order queue 116 stores segments that are next-in-order and ready to be sent to application instance 122. Out-of-order queue 118 stores segments that are out-of-order and not ready to be sent to application instance 122. A segment is out of order if it follows one or more lost, delayed, or otherwise missing segments that have not yet been received by transport protocol logic 112.

The next-in-order application-layer messages are forwarded to application instance 122. Upon receipt of an application-layer message for an application-layer session, application-layer instance 122 may set or reset an application-layer session hold timer 124, which indicates how long the application-layer session is to remain open in the absence of received application-layer messages for the application-layer session. For example, application-layer session hold timer 124 may be set to expire in 9 seconds if no application-layer messages are received by application instance 122 for 9 seconds. Application-layer session hold timer 124 may be any value that is appropriate and agreed upon by application instances 104, 122. In another embodiment, application-layer session hold timer 124 is initially set to expire in 180 seconds.

During the application-layer session, application instance 122 may detect that no application-layer messages have been received for the amount of time such as that specified by application-layer session hold timer 124. Application instance 122 may detect expiration of the hold timer before passage of the full time period in which the application-layer session is to remain live in the absence of activity. In one example, application instance 122 detects that a percentage, such as 90%, of the full time period has passed. In another example, application instance 122 detects that all but a certain number of seconds, such as 10 seconds, of the time period has passed. In yet another example, application instance 122 detects that the full time period has already passed. All of these examples are implementation examples of application instance 122 detecting expiration of application-layer session hold timer 124.

Upon detecting expiration of application-layer session hold timer 124, before tearing down the application-layer session, application instance 122 checks out-of-order queue 118 for received but not yet forwarded application-layer messages that belong to the expiring application-layer session. As shown, hold timer extending logic 126 on application instance 122 reads out-of-order message 120 from out-of-order queue 118. If hold timer extending logic 126 determines that out-of-order message 120 belongs to the expiring application-layer session, then hold timer extending logic 126 may extend application-layer session hold timer 124 rather than tearing down the application-layer session.

Tearing down the application-layer session may include deleting information accumulated during the application-layer session and resetting the application-layer session such that the application-layer session must be reopened before further application-layer messages may be received at application instance 122 on the application-layer session. Depending on the amount of information that has been accumulated for the application-layer session, deleting and re-establishing such information may require a huge amount of bandwidth, time, processing resources, power, and memory. According to various embodiments, this overhead may be avoided when the out-of-order queue includes one or more application-layer messages which, if received by application instance 122, cause application instance 122 to extend the application-layer session.

Once application instance 122 has detected that an application-layer message belonging to the expiring application-layer session is in out-of-order queue 118, application instance 122 may optionally perform further actions in an attempt to prevent the application-layer session from being torn down. In one embodiment, application instance 122 triggers a fast retransmission by network switch 102 of a missing next-in-order segment. For example, application instance 122 may send duplicate acknowledgements of a segment received prior to the missing next-in-order segment.

If hold timer extending logic 126 reads information stored in out-of-order queue 118 and cannot find any application-layer messages that belong to the application-layer session, then hold timer extending logic 126 allows the application-layer session to be torn down. In one embodiment, hold timer extending logic 126 allows the application-layer session to be torn down if, after extending application-layer session hold timer 124, no further application-layer messages have been received and the hold timer has expired for a second time.

In one embodiment, to support a later determination that the application-layer session hold timer 124 is expiring for a second time, hold timer extending logic 126 sets a flag when the application-layer session hold timer is extended for the first time. Upon detecting an expiration of the hold timer for the second time, hold timer extending logic 126 determines that the flag is set and, in response, tears down the application-layer session.

2.1 Ordering and Forwarding Messages From the Transport Layer to the Application Layer Transport layer endpoints communicate with each other to transport and order application-layer messages for applications. A sending transport-layer endpoint embeds an application-layer message in a transport-layer message, and the transport-layer message is sent to a receiving transport-layer endpoint. The receiving transport-layer endpoint processes incoming segments to determine an order in which the segments were sent by the sending transport-layer endpoint.

In one embodiment, Transmission Control Protocol ("TCP") logic tests incoming segments for their proper sequence number. TCP is defined, for example, in RFC (Request for Comments) 793 and other RFCs. Although various techniques may be described with reference to TCP, the techniques described herein are general in nature and may be extended to any transport-layer protocol that orders messages sent between application instances. Other transport-layer protocols may include, but are not limited to, Datagram Congestion Control Protocol (DCCP), Stream Control Transmission Protocol (SCTP), or any other now known or later developed reliable transport protocol.

Segments within an expected range (i.e., the "receive window") are queued and forwarded in sequence order to the application instance. If a segment is missing, then subsequent segments are stored in an out-of-order queue. Segments remain in the out-of-order queue until the missing segment is received.

In-order segments are stored in the in-order queue. Although segments in the in-order queue are available to be sent to the application, unsent segments may remain in an in-order queue until a buffer is filled. In this manner, the transport-layer may efficiently forward in-order segments that include ordered application-layer messages to the application-layer. In one embodiment, application-layer messages are extracted from the segments and forwarded to the application-layer.

Figure 2:
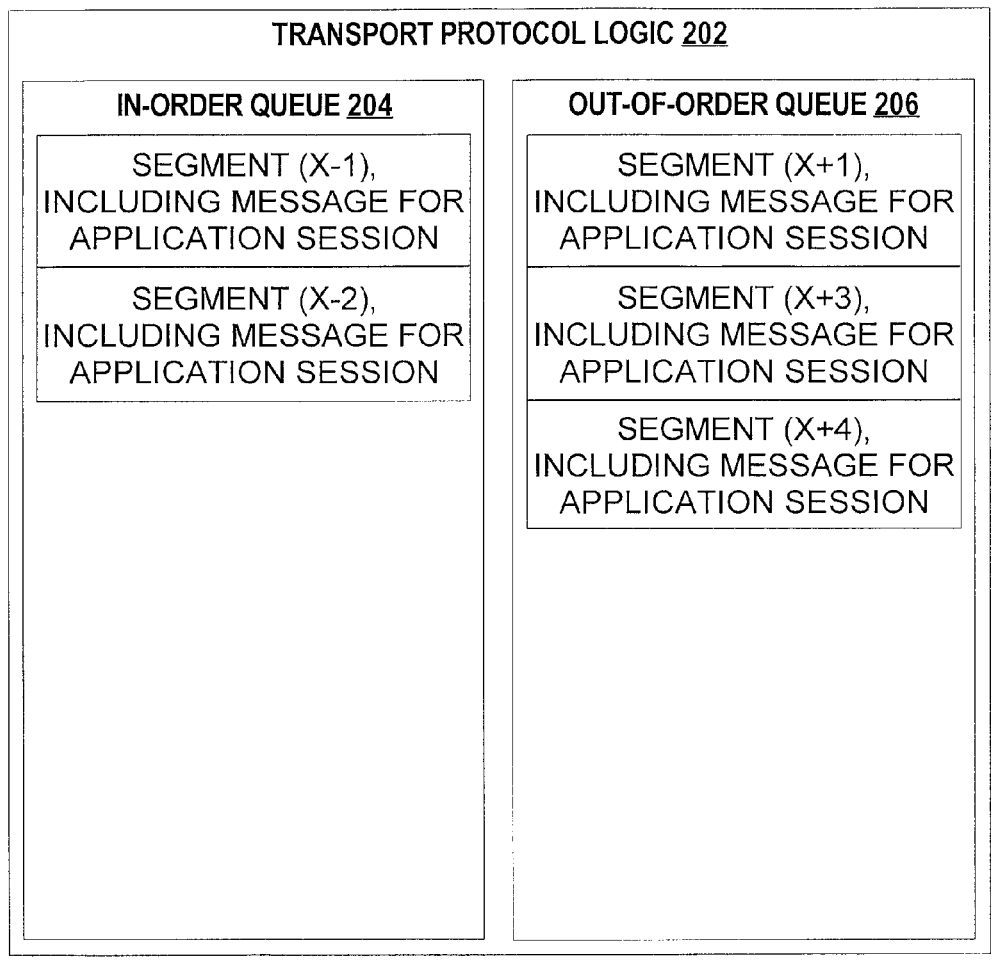
FIG. 2 illustrates an example in-order-queue and an example out-of-order queue of the transport protocol logic when segments are missing.

FIG. 2 illustrates an example in-order-queue and an example out-of-order queue of the transport protocol logic in an environment where segments are missing.

In an embodiment, segments with sequence numbers x−2 and x−1, which includes messages for an application-layer session, have been received by transport-protocol logic 202, are stored in an in-order queue 204, and ready to be sent to the corresponding application instance. Segments with sequence numbers x and x+2, which include messages for the application-layer session, are missing. Although segments with sequence numbers x+1, x+3, and x+4 have been received by transport protocol logic 202, these segments are stored in out-of-order queue 206 because they are not ready to be sent to the application instance. Transport protocol logic ensures that segments are correctly ordered before forwarding the segments to the application instance.

In the example, transport protocol logic 202 will wait for the segment with sequence number x before moving the segment with sequence number x+1 from out-of-order queue 206 to in-order-queue 204 and forwarding the segments with sequence numbers x and x+1 to the application instance. Similarly, transport protocol logic 202 will wait for the segments with sequence numbers x and x+2 before moving the segments with sequence numbers x+3 and x+4 from out-of-order queue 206 to in-order-queue 204 and forwarding the segments to the application instance.

2.2 Maintaining the Application Hold Timer

The techniques described herein may be applied to any application instance that uses a reliable transport-layer protocol to order messages received at the transport-layer before forwarding the messages to the application-layer. Example applications include, but are not limited to: Border Gateway Protocol ("BGP"), Interior Gateway Protocol ("IGP"), Exterior Gateway Protocol ("EGP"), Dynamic Host Configuration Protocol ("DHCP"), File Transfer Protocol ("FTP"), Hypertext Transfer Protocol ("HTTP"), Internet Message Access Protocol ("IMAP"), Network File System protocol ("NFS"), Post Office Protocol ("POP"), Routing Information Protocol ("RIP"), Simple Mail Transfer Protocol ("SMTP"), Simple Network Management Protocol ("SNMP"), Open Shortest Path First dynamic routing protocol ("OSPF"), Bootstrap protocol, Telnet network protocol, or any other now known or later developed protocol for receiving application-layer messages at the application layer. An example of BGP that is widely used as an application-layer protocol is defined by RFC (Request for Comments) 4271.

An application-layer session is initiated between application instances to communicate application-layer messages. An application-layer session may be bound by a hold timer, which may be negotiated, for example, when the application-layer session is initiated. In one example, the application is bound by a 180 second hold timer value, and application-layer keepalive messages are sent every 90 seconds to keep the application-layer session alive. In another example, the application is bound by a 9 second hold timer value, and application-layer keepalive messages are sent every 3 seconds. According to the techniques described herein, the hold timer may be any value that triggers an application instance to peek an out-of-order queue instead of immediately tearing down an application-layer session. In other implementations, keepalive messages may be sent more or less frequently or not at all.

The hold timer is reset as new packets are received at the application-layer. In one embodiment, only keepalive messages reset the hold timer. In other embodiments, any application-layer message may reset the hold timer. The hold timer expires after an amount of time has passed since the application instance last received a message that belongs to the application-layer session. In one embodiment, the amount of time that passes may be in the proximity of the hold timer value without reaching or surpassing the hold timer value. For example, a hold timer may be said to expire when 90% of the hold time passes or when all but 10 seconds of the hold time passes.

The application instance monitors the hold timer and determines when the hold timer has expired. In one embodiment, in response to determining that the hold timer has expired, the application instance checks a transport-layer out-of-order queue to determine whether transport protocol logic has received but not forwarded any out-of-order messages that belong to the application-layer session.

Figure 3:
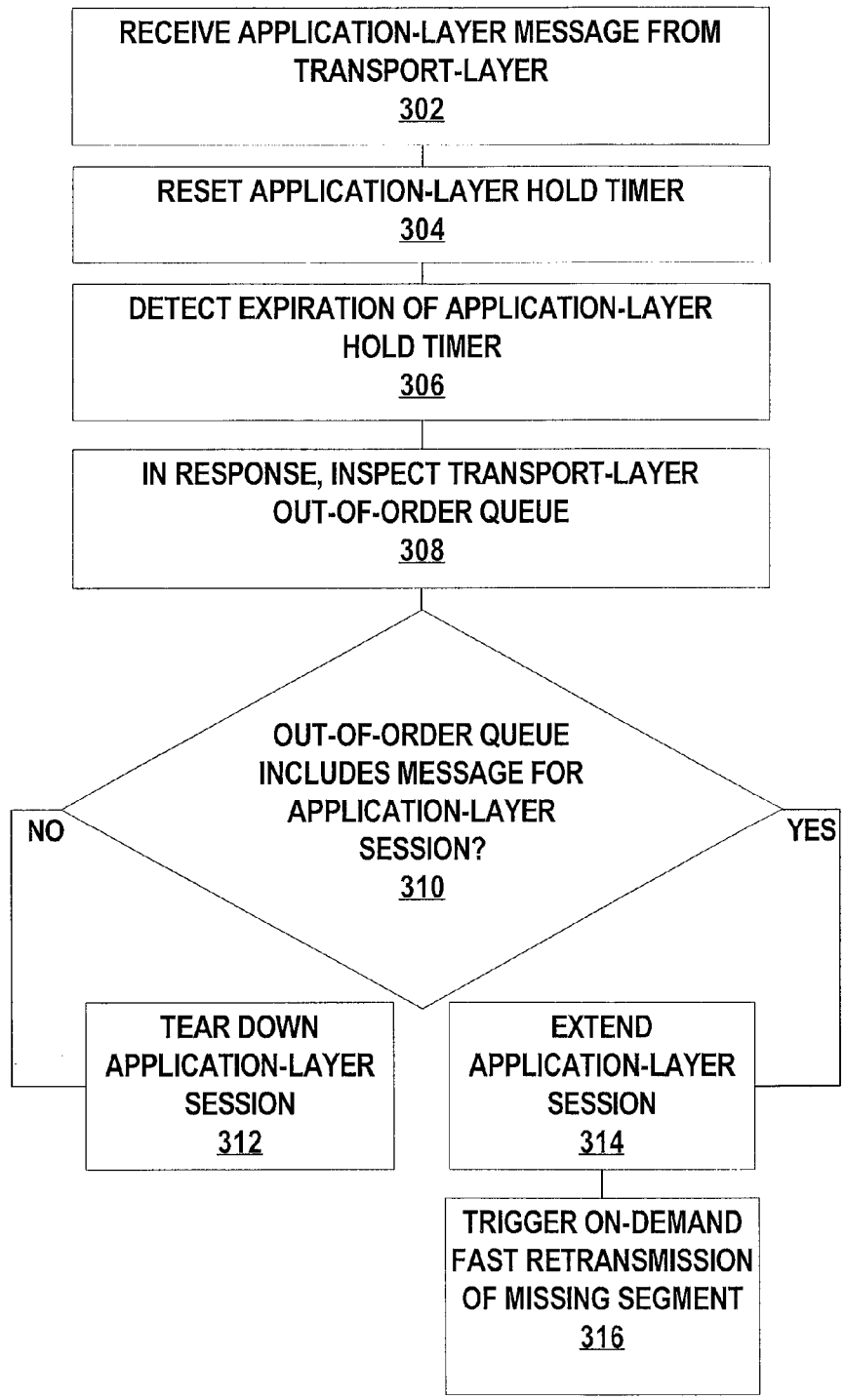
FIG. 3 illustrates an example technique for determining whether or not to extend the hold timer for an application-layer session.

FIG. 3 illustrates an example technique for determining whether or not to extend the hold timer for an application-layer session.

In step 302, an application instance receives an application-layer message forwarded from a transport-layer endpoint. As shown in step 304, the application instance resets the application-layer hold timer for an application-layer session in response to receiving an application-layer message that belongs to the application-layer session. After some amount of time has passed, such as the amount of time specified by the hold timer, the application instance detects expiration of the application-layer hold timer in step 306.

In response, in step 308, the application inspects an out-of-order queue at the transport layer to determine, in step 310, whether any out-of-order packets were received at the transport layer but not yet forwarded to the application. If the transport-layer out-of-order queue does not include any messages that belong to the expiring application-layer session, then the application-layer session is torn down in step 312.

On the other hand, if the out-of-order queue does include messages that belong to the expiring application-layer session, then the application-layer session is extended by the application in step 314. For example, the application may extend the application-layer session hold timer. Optionally, in step 318, the application may trigger a fast retransmission of a missing in-order segment by a remote peer.

2.3 Peeking into the Transport-Layer Out-of-Order Queue

Before tearing down the application-layer session, the application instance peeks into the out-of-order queue of the transport layer to determine whether any segments have been received by the transport layer but not yet forwarded to the application instance. The techniques described herein are not limited to any particular manner of peeking into the out-of-order queue. In one example, the transport layer provides an interface that allows the application instance to peek into the out-of-order queue. In another example, the out-of-order queue is stored in shared memory. In yet another example, information from the out-of-order queue is periodically copied to storage that is accessible to the application instance.

The application may use various criteria for peeking out-of-order messages from the out-of-order queue at the transport layer. An example request from the application to the transport protocol logic is "PEEK (criteria a, criteria b, . . . )." Any criteria or any combination of criteria may be used by the application to peek out-of-order messages. The techniques described herein are not limited to any specific examples of criteria.

In one embodiment, the application specifies, in a request for out-of-order messages from the transport layer, a maximum size of each out-of-order message to read. For example, the maximum size may be the size of an application-layer header. In another example, the maximum size may include a portion of the application-layer payload.

In another embodiment, the application specifies, in a request for out-of-order messages from the transport layer, a maximum number of out-of-order messages to read. For example, the application may read the first ten messages, or as many messages as would fit in an out-of-order message buffer for storing the out-of-order messages read by the application. The application may separately specify a maximum total size of information to read from the out-of-order queue, such as the amount of information that would fit in the out-of-order message buffer.

The application may specify, in a request for out-of-order messages, a connection identifier associated with an expiring application-layer session. For example, the application may provide a local connection name that refers to a (local socket, foreign socket) combination that is recognized at the transport layer.

Another criterion that may be specified by the application relates to a position of the messages to be searched within the out-of-order queue. This criterion may be specified as, for example, a start position from which to search and a length of each message to provide from the start position.

Figure 4:
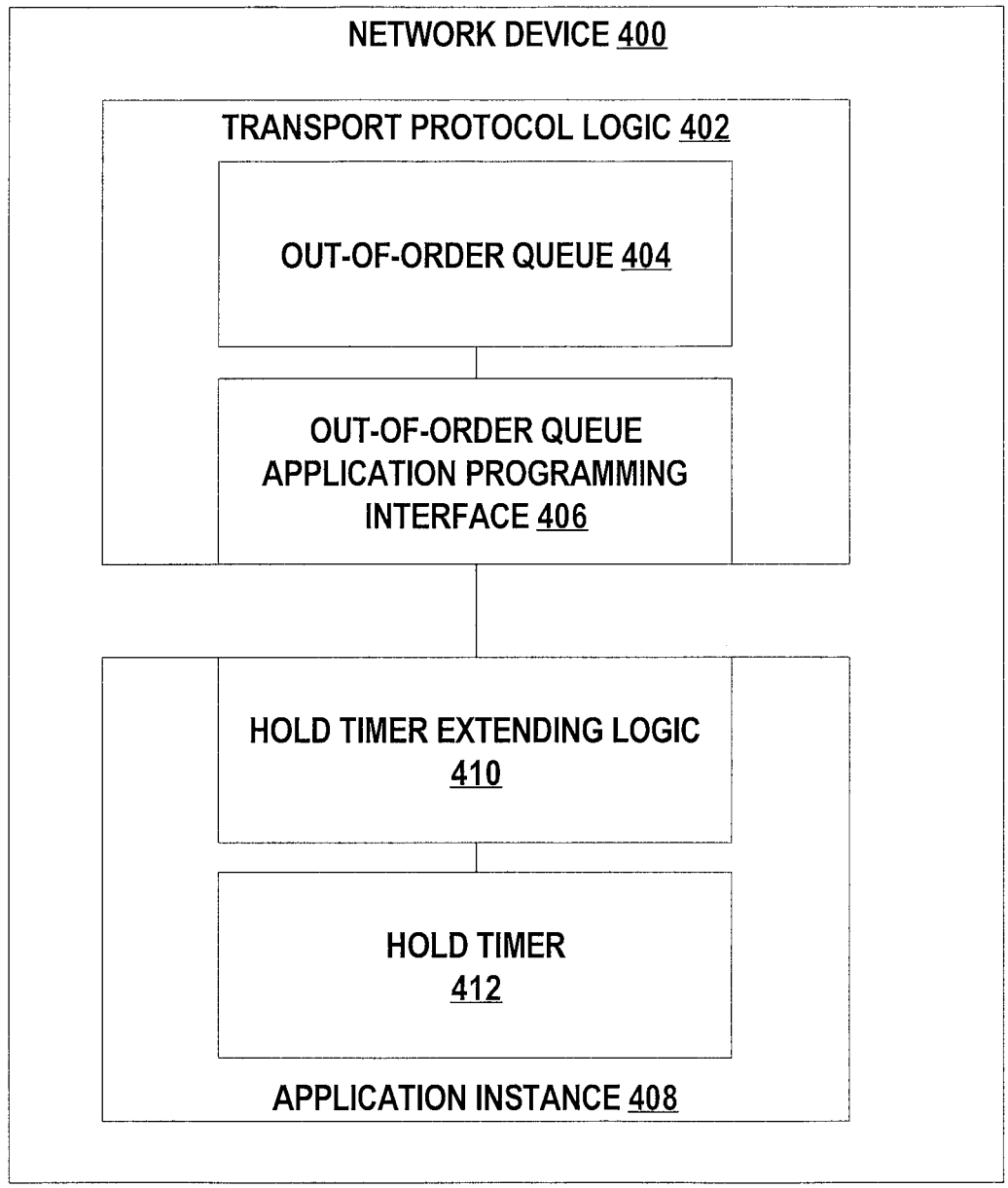
FIG. 4 illustrates an example application programming interface that provides an application with access to the out-of-order queue.

FIG. 4 illustrates an example application programming interface that provides an application with access to the out-of-order queue.

In an embodiment, network device 400 includes transport protocol logic 402 and application instance 408. For the purposes of this description, the transport protocol logic orders messages for the application instance, whether or not the transport protocol logic is hosted on the same device or on a separate device from the application instance. Transport protocol logic 402 includes out-of-order queue 404 and out-of-order queue application programming interface 406, which provides application instance 408 with access to out-of-order queue 404. Application instance 408 includes hold timer 412 and hold timer extending logic 410, which extends hold timer 412 when hold timer 412 has expired and out-of-order queue 404 includes an application-layer message that belongs to the expiring application-layer session.

FIG. 5 illustrates an example technique for providing an application programming interface that gives an application instance access to the out-of-order queue.

In an embodiment, in step 502, the transport protocol logic listens for commands on an application programming interface to an out-of-order queue. In step 504, the transport protocol logic receives a command from an application instance on the application programming interface to the out-of-order queue. The command is executed in step 506, and the transport protocol returns the requested information from the out-of-order queue to the application instance.

2.4 Extending the Application Layer Session

The application instance extends the application-layer session in response to determining that the out-of-order queue holds a message that belongs to an expiring application-layer session. The application-layer session may be extended by resetting the hold timer to its default value. In one example, an expiring hold timer at or nearing zero seconds was initially set at 180 seconds. In response to detecting an out-of-order message belonging to the application-layer session, the hold timer would be reset to 180 seconds. In another embodiment, the hold timer is extended to a value other than the default value. For example, the hold timer may be extended to a fraction, such as one-half, one-third, or even twice the default hold timer value.

In one embodiment, hold timer extending logic sets a flag when the application-layer session is extended for a first time. If the hold timer expires a second time, the application-layer session checks the flag to determine whether the session has been previously extended. In response to determining that the flag is set, the hold timer extending logic tears down the session rather than extending the session.

In one embodiment, the application may extend the hold timer multiple times before reaching a maximum threshold number of times that the hold timer may be extended. In this embodiment, the application may keep track of the number of times in which the hold timer has been extended. In another example, a maximum amount of time for extending the hold timer may be provided by the application. In this embodiment, the application may keep track of the total amount of time that the hold timer has been extended.

2.5 Inducing a Retransmission of a Missing Packet

In response to detecting an out-of-order message for an expiring application-layer session, in addition to extending the application-layer session, the application may induce a retransmission of a missing segment by sending one or more duplicate acknowledgement messages to a remote peer that originally sent the missing segment. In a specific example, the application causes two duplicate acknowledgement messages to be sent to the remote peer. If one duplicate acknowledgement has already been sent, then the remote peer will have received three total duplicate acknowledgement messages. In TCP, RFC 2001 explains that three duplicate acknowledgement messages will automatically trigger a fast retransmission of a missing segment that follows the acknowledged segment.

3.0 Implementation Example—Extending a BGP Hold Timer

In an embodiment, a BGP application extends a BGP hold timer in response to detecting that an out-of-order BGP message was received but not yet forwarded by TCP logic. In one embodiment, the BGP application searches the out-of-order queue for a BGP keepalive message, which is included in the 19 byte header of a BGP application-layer message.

The BGP hold timer may be extended one or more times in order to avoid a costly tear down and re-initiation of the BGP session. For example, a premature teardown of a BGP session can cause the de-allocation of a significant amount of space and the deletion of large routing tables that allow BGP to make important routing decisions. In order to re-establish the BGP session, the BGP application would need to communicate with a remote BGP peer to set up a session, re-allocate the space required by the session, and request that the large routing tables be re-sent by the remote BGP peer. The remote BGP peer re-sends the large routing tables, consuming a considerable amount of time and bandwidth that may be avoided if the BGP session is not prematurely torn down.

4.0 Implementation Mechanisms—Hardware Overview

Figure 6:
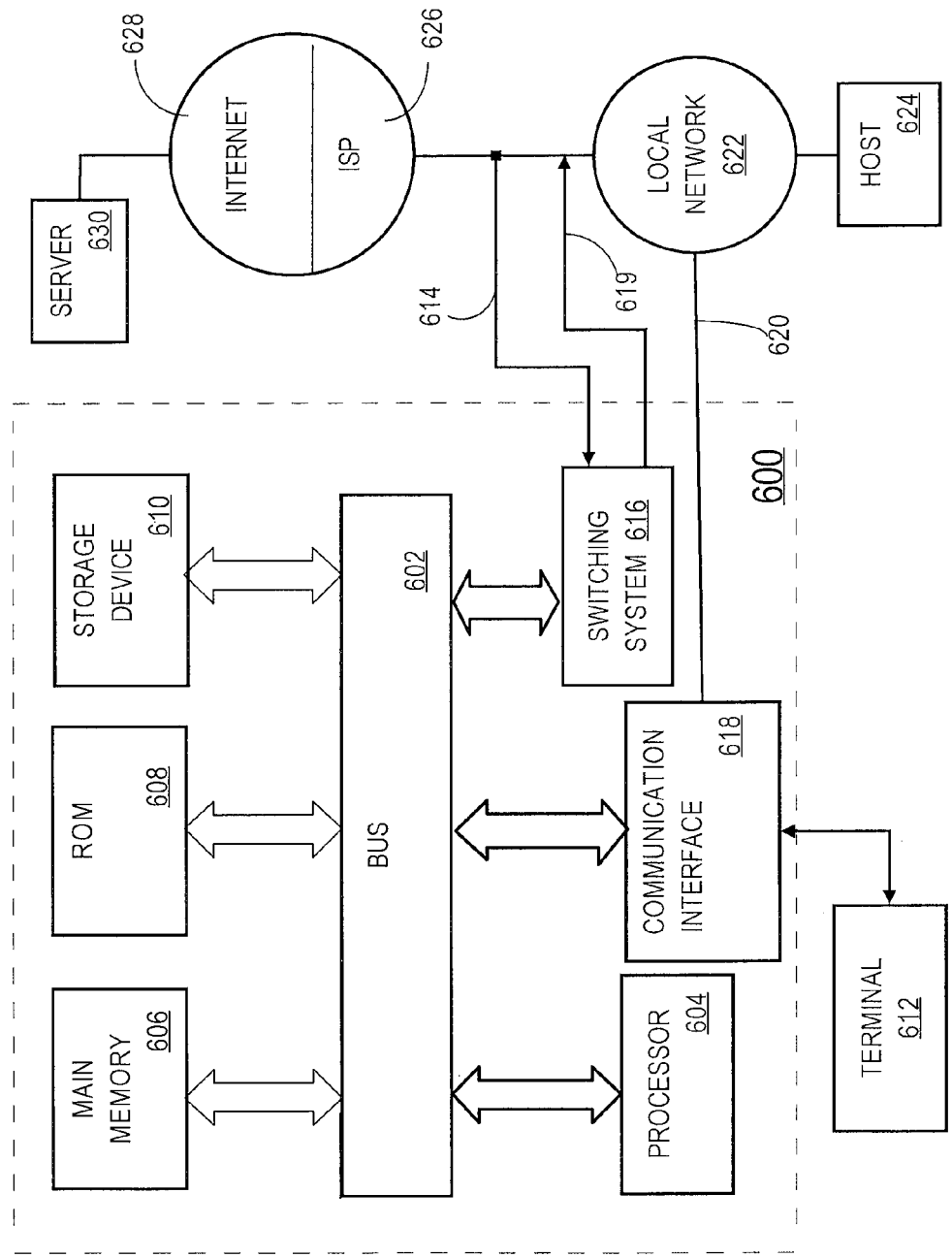
FIG. 6 illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for peeking the out-of-order queue of the transport layer rather than immediately tearing down an expiring application-layer session. According to one embodiment of the invention, an application-layer session is extended by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile storage media, volatile storage media, and transmission media. Non-volatile storage media includes, for example, optical or magnetic disks, such as storage device 610. Volatile storage media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for peeking into the out-of-order queue at the transport layer rather than immediately tearing down the application-layer session, as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving an application-layer message from transport protocol logic that is configured to deliver in-order application-layer messages to an application;
   wherein the received application-layer message is a next in-order application-layer message for an application-layer session that is bound by a hold timer;

detecting an expiration of the hold timer for the application-layer session;

in response to detecting the expiration of the hold timer for the application-layer session, inspecting an out-of-order queue of the transport protocol logic and determining whether or not to extend the hold timer based at least in part on whether the out-of-order queue includes any out-of-order application-layer messages for the application-layer session;

wherein, unless the hold timer is extended, expiration of the hold timer causes deletion of information that was accumulated during the application-layer session;

wherein extending the hold timer prevents the deletion of information that was accumulated during the application-layer session;

extending the hold timer based at least in part on determining that the out-of-order queue includes an out-of-order application-layer message; and wherein the method is performed by one or more computing devices.

2. The method of claim 1, further comprising reading a set of out-of-order messages from the out-of-order queue; discovering that the out-of-order application-layer message is in the set.

3. The method of claim 1, further comprising specifying a maximum size of each out-of-order message in a request for a set of out-of-order messages from the out-of-order queue.

4. The method of claim 3, wherein the out-of-order application-layer message is an application-layer keepalive message, and wherein the maximum size of each out-of-order message is a size of the application-layer keepalive message.

5. The method of claim 1, further comprising specifying a maximum number of out-of-order messages to read in a request for a set of out-of-order messages from the out-of-order queue.

6. The method of claim 1, further comprising specifying a connection identifier associated with the application-layer session in a request for a set of out-of-order messages from the out-of-order queue.

7. The method of claim 1, further comprising, in response to extending the hold timer, triggering a fast retransmission of a missing in-order segment comprising a missing in-order application-layer message for the application-layer session by sending at least two duplicate acknowledgements for a received segment that precedes the missing in-order segment.

8. The method of claim 1, wherein the application-layer message comprises a Border Gateway Protocol ("BGP") message, wherein the application-layer session comprises a BGP session, wherein the hold timer comprises a BGP hold timer, and wherein the transport protocol logic comprises Transmission Control Protocol ("TCP") logic.

9. The method of claim 1, further comprising:

sending the application-layer message to the application;

receiving, from a transport protocol peer, the out-of-order application-layer message for the application-layer session, and storing the out-of-order application-layer message in the out-of-order queue;

receiving, from the application via an application programming interface for accessing information from the out-of-order queue, a request for information from the out-of-order queue; and in response to receiving the request, sending, to the application, information that describes the out-of-order application-layer message.

10. A non-transitory computer-readable medium storing one or more sequences of instructions, which the one or more sequences of instructions, when executed by one or more processors, cause the one or more processors to carry out the steps of:

receiving an application-layer message from transport protocol logic that is configured to deliver in-order application-layer messages to an application;

wherein the received application-layer message is a next in-order application-layer message for an application-layer session that is bound by a hold timer;

detecting an expiration of the hold timer for the application-layer session;

in response to detecting the expiration of the hold timer for the application-layer session, inspecting an out-of-order queue of the transport protocol logic and determining whether or not to extend the hold timer based at least in part on whether the out-of-order queue includes any out-of-order application-layer messages for the application-layer session;

wherein, unless the hold timer is extended, expiration of the hold timer causes deletion of information that was accumulated during the application-layer session;

wherein extending the hold timer prevents the deletion of information that was accumulated during the application-layer session; and extending the hold timer based at least in part on determining that the out-of-order queue includes an out-of-order application-layer message.

11. The non-transitory computer-readable medium of claim 10, further comprising one or more sequences of instructions which, when executed by the one or more processors, cause the one or more processors to perform reading a set of out-of-order messages from the out-of-order queue; discovering that the out-of-order application-layer message is in the set.

12. The non-transitory computer-readable medium of claim 10, further comprising one or more sequences of instructions which, when executed by the one or more processors, cause the one or more processors to perform specifying a maximum size of each out-of-order message in a request for a set of out-of-order messages from the out-of-order queue.

13. The non-transitory computer-readable medium of claim 12, wherein the out-of-order application-layer message is an application-layer keepalive message, and wherein the maximum size of each out-of-order message is a size of the application-layer keepalive message.

14. The non-transitory computer-readable medium of claim 10, further comprising one or more sequences of instructions which, when executed by the one or more processors, cause the one or more processors to perform specifying a maximum number of out-of-order messages to read in a request for a set of out-of-order messages from the out-of-order queue.

15. The non-transitory computer-readable medium of claim 10, further comprising one or more sequences of instructions which, when executed by the one or more processors, cause the one or more processors to perform specifying a connection identifier associated with the application-layer session in a request for a set of out-of-order messages from the out-of-order queue.

16. The non-transitory computer-readable medium of claim 10, further comprising one or more sequences of instructions which, when executed by the one or more processors, cause the one or more processors to perform in response to extending the hold timer, triggering a fast retransmission of a missing in-order segment comprising a missing in-order application-layer message for the application-layer session by sending at least two duplicate acknowledgements for a received segment that precedes the missing in-order segment.

17. The non-transitory computer-readable medium of claim 10, wherein the application-layer message comprises a Border Gateway Protocol ("BGP") message, wherein the application-layer session comprises a BGP session, wherein the hold timer comprises a BGP hold timer, and wherein the transport protocol logic comprises Transmission Control Protocol ("TCP") logic.

18. The non-transitory computer-readable medium of claim 10, further comprising one or more sequences of instructions, which, when executed by the one or more processors, cause the one or more processors to perform:
   sending the application-layer message to the application;
   receiving, from a transport protocol peer, the out-of-order application-layer message for the application-layer session, and storing the out-of-order application-layer message in the out-of-order queue;
   receiving, from the application via an application programming interface for accessing information from the out-of-order queue, a request for information from the out-of-order queue; and
   in response to receiving the request, sending, to the application, information that describes the out-of-order application-layer message.

* * * * *